Jan. 7, 1936.  E. PEARSON  2,026,593

SYSTEM FOR THE REMOTE OPERATION OF POWER PLANTS

Filed March 21, 1931

Fig.2  Fig.3  Fig.1

Erick Pearson, Inventor

By Caswell & Lagaard, Attorneys

Patented Jan. 7, 1936

2,026,593

UNITED STATES PATENT OFFICE 2,026,593

SYSTEM FOR THE REMOTE OPERATION OF POWER PLANTS

Erick Pearson, Minneapolis, Minn.

Application March 21, 1931, Serial No. 524,400

25 Claims. (Cl. 290—4)

This application relates to automatic prime mover-generator power plants including remote control features, and is of the nature of the plants shown in, and comprises features disclosed in, my application for patent on System for automatic parallel coupling of synchronous alternating current machines, filed September 24, 1926, Serial No. 133,645 and my application for patent on Automatic synchronizers, filed February 26, 1924, Serial No. 695,153, which applications have issued as Patents No. 1,944,996, Jan. 30, 1934 and No. 1,820,319, Aug. 25, 1931, respectively.

My invention relates to power plants and to the actuation and control of generators therein and particularly to power plants having a generator driven by a water turbine and controlled by a governor operating to open and close the gate governing the flow of water from the mill pond to the turbine.

An object of the invention resides in providing a system whereby a generator may be completely controlled automatically from a remotely situated control station.

Another object of the invention resides in providing a system in which the actuation and control of the generator may be accomplished by direct current.

A still further object of the invention resides in providing a plurality of devices for actuating and controlling the apparatus and equipment of the power plant and for controlling the starting and operation of a generator and synchronizer of a power plant, said devices having electric circuits and in further providing a control circuit leading from a distant point for rendering said last named circuits operable.

A feature of the invention resides in providing a system in which direct current may be used in the control circuit.

An object of the invention resides in providing a system including two circuits for connecting the generator to the distribution line under different conditions, and in providing switch means for closing a circuit operated from the control circuit and adapted to render one of said first named circuits operable upon flow of current in the control circuit in one direction and to render the other of said circuits operable upon the flow of current in the control circuit in the opposite direction.

Another object of the invention resides in providing means for causing the reverse flow of current in the control circuit.

A still further object of the invention resides in utilizing a polarized relay for the actuation of said circuits.

An object of the invention resides in providing a time controlled switch and a switch responsive to conditions of the head water of the turbine for operating the generator, said switches being operable to start the generator.

Another object of the invention resides in providing regulating means for adjusting the operation of the governor to control the power delivered by the generator and to provide a circuit for rendering said means operable, said circuit including a time controlled switch and a switch responsive to the condition of the head water connected in series therein and adapted to render said regulating means inoperable.

An object of the invention resides in providing a device responsive to the opening of the gate, a device responsive to the condition of the head water together with indicating circuits for operating the same and for indicating the position of said devices, the device responsive to the gate opening being normally operative and to further provide a switch adapted to be operated when the governor reaches full open gate position for opening the circuit indicating gate opening and closing the circuit indicating the condition of the head water.

Another object of the invention resides in providing a meter adapted to be connected with either of said indicating circuits, said switch adapted to be operated when the governor reaches full open gate position, serving to disconnect the meter from said gate opening indicating circuit and with said head water indicating circuit.

A still further object of the invention resides in providing a device for opening the gate in proportion to the height of the headwater, and to further provide a switch for rendering said device operable and in providing a device for indicating the position of the gate, said last named device being rendered operable by said switch.

An object of the invention resides in providing in conjunction with the generator shaft, an axially disposed contact at the end of said shaft and revoluble therewith and a fixed member for engagement with said contact and in still further providing a circuit including said contact and member.

A feature of the invention resides in providing protective switches for the generator included in said circuit and adapted to alter the operation of the generator.

An object of the invention resides in maintaining the excitation of the generator field for a predetermined time after operations have been commenced for shutting down the generator to cause the exciter to act as a magnetic brake and arrest the movement of the generator.

An object of the invention resides in providing a thermostatically operated switch carried by the generator shaft and disposed in proximity to the bearing surface thereof, said switch being in the circuit including said contact and member.

Another object of the invention resides in providing a centrifugally operated switch revoluble with the generator shaft and also connected in said circuit for regulating the speed of the generator.

A still further object of the invention resides in providing a switch and a circuit adapted to be operated to shut down the generator in the event that the generator shaft changes position and particularly by dropping of the shaft from its normal operative position.

Another object of the invention resides in providing a motor operated, potential regulator for maintaining constant potential at the generator and further providing a device for disconnecting the motor and bringing the regulator quickly back to normal position.

A feature of the invention resides in providing a potential relay operated by the voltage of the generator and controlling a plurality of circuits, each having an auxiliary relay therein, and in further providing a plurality of resistors operated by said auxiliary relays for regulating the voltage of the generator.

An object of the invention resides in providing an exciter for the generator having a field coil and a resistance in series therewith and in further providing an auxiliary relay operated by the exciter potential for shunting out said resistance until the exciter potential has reached a proper value.

Another object of the invention resides in providing a centrifugally operated switch operable at a speed proportional to the speed of the generator for rendering the potential regulator operable when the generator reaches a predetermined speed.

An object of the invention resides in providing a motor for operating the fly balls of the governor connected to the generator and in providing a motor for operating the generator exciter and in still further providing means for operating the exciter motor to excite the field of the generator prior to the operation of the governor motor.

A still further object of the invention resides in providing a device operated from the exciter potential for actuating the governor to start the generator.

A feature of the invention resides in providing the governor for the generator with a regulating member and in providing a time controlled device operated by the control line for gradually adjusting said regulating member to gradually reduce the load on the generator and to operate the circuit breaker when the generator has assumed predetermined load and to further adjust said regulating member to shut down the generator.

An object of the invention resides in providing a device including a pivoted lever connected to the oil line for shutting down the generator in the event that any of the bearings of the moving parts of the power plant be deprived of oil.

Another object of the invention resides in providing in the mill pond two conductors, one of high resistance and the other of low resistance, said conductors extending in a vertical direction and being adapted to short a portion of the conductor of high resistance proportional to the height of the water in the mill pond and in further providing a circuit connected therewith and including an indicating device for indicating the height of the water in the mill pond.

An object of the invention resides in providing separate devices for indicating the condition or positions of parts or apparatus in the power plant and in providing a system for successively transmitting the indications from these devices to a remote point.

Another object of the invention resides in utilizing the ordinary telephone system for giving the desired signals or indications and in providing circuits adapted to be operated upon closure of the telephone circuit for rendering the signalling or indicating devices operative.

Other objects of the invention reside in the novel combination and arrangement of parts and in the details of construction hereinafter illustrated and/or described.

Figures 1, 2, 3:
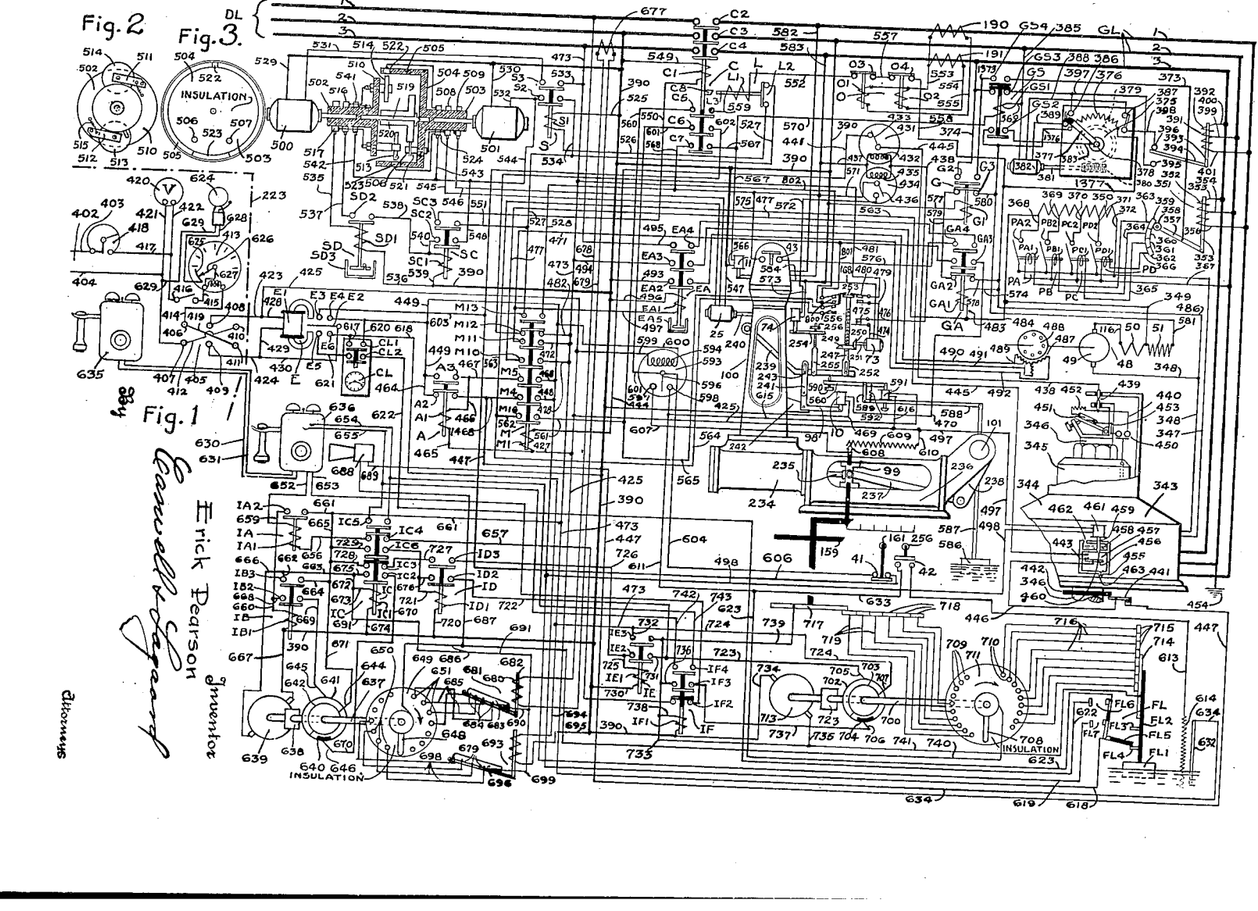
Fig. 1 is a wiring diagram of a system illustrating an embodiment of my invention.
Fig. 2 is an enlarged detail end view of one revolving contact structure thereof.
Fig. 3 is a similar view of the other revolving contact structure thereof.

My invention is intended for the remote control and operation of a sub-station for generating electrical energy. Such installations usually include a distribution line or a net work fed by a number of sub-stations, having individually operated generators therein. In the operation of such systems, it becomes desirable to control and operate the sub-station from a certain control station. Such a control station may be situated at one of the power plants or at an entirely different locality. In a particular installation shown in the drawing, the control station has been illustrated as an independent station and the installation has been shown as operated by direct current, a separate control line running from the control station to a particular power station to be operated and controlled. In Fig. 1 the dotted line 223 separates the equipment in the control station from that in the power plant, the former lying to the left of said line and the latter to the right of it.

In the drawing, the distribution line has been indicated by the reference characters DL, the three phases thereof being marked 1, 2 and 3 and likewise the generator line indicated by reference characters GL and the phases thereof being indicated at 1, 2 and 3. For operating certain of the devices used in conjunction with the invention both the generator and distribution system potential are employed and for this purpose phase 2 of both the distribution line DL and generator line GL have been connected togther and to a common bus 390 which will herewith be referred to as the common. In conjunction with the distribution line and generator line, a circuit breaker C is employed having a coil C1, switches C2, C3 and C4 for connecting the generator line to the distribution line and other switches C5, C6 and C7 which will be presently more fully described.

The source of current for the generator line GL consists of a three phase synchronous generator 343 comprising a frame 344 having the usual stator and a rotor 345 revoluble relative thereto. The rotor 345 is mounted on a shaft 346 which extends downwardly to the water wheel or turbine for operating the same which has not been illustrated in the drawing. The stator of the generator 343 is directly connected to the three phases 1, 2 and 3 of generator line GL while the rotor which includes the field coils of the generator is connected to two conductors 347 and 348 which in turn are connected to the exciter system for the generator. The speed of the generator 343 is controlled through a governor 100 which may be of any desired form.

The form of governor illustrated is of the centrifugal type having fly balls adapted to control suitable valves to introduce fluid under pressure from a tank through a pipe line and into a cylinder 234.

The fly balls of the governor 100 are operated by a variable speed motor within the case thereof which operates at a speed dependent upon the frequency of the source of potential to which it is connected. This motor is not shown in the drawing but is energized from three conductors 582, 583 and 584. The conductor 582 is connected to phase 1 of the generator line and conductor 583 is connected to phase 3 of the generator line while conductor 584 is connected to the common 390. As soon as the generator potential picks up, the motor operating the fly balls is actuated and the governor set into operation. The fly balls of the governor 100 operate against the pressure of a spring whose tension may be varied by the rotation of a shaft 240 driven from an electric motor 25. When the shaft 240 rotates in one direction the pressure exerted by the spring is lessened to cause a decrease in gate opening and when the shaft 240 is rotated in the other direction the pressure of said spring is increased to cause an increased gate opening. The motor 25 is adapted to be rotated in either direction through two separate circuits energizing the same, which will be later described in detail. The cylinder 234 has the usual piston therein (not shown) which is connected to a piston rod 235 which operates a cross head 99 slidable in the guide 236. The cross head 99 has pivotally connected to it a connecting rod 237 which is pivoted to a crank 238. The crank 238 is secured to a shaft 101 directly connected to the gate (not shown) which controls the flow of water to the water wheel or prime mover for the generator.

The governor 100 includes a limit lever 239 which independently limits the movement of the valve control apparatus operated by the fly balls and the subsequent opening of the gate controlling the flow of water to the water wheel. When this lever is depressed, the ultimate gate opening is greater than when the lever is raised and when the lever 239 is raised the maximum amount, the gate is completely shut and the water wheel deprived of water.

The starting and stopping of the prime mover is accomplished through the limit lever 239 of the governor 100 which in turn controls the gate opening. This is accomplished by means of a bell crank 98 pivoted to a bracket 242 on the governor proper. This bell crank has pivoted to it a slotted link 241 which engages a pin 243 on the lever 239. When the bell crank 98 is swung to bring the link 241 in alignment with the arm thereof to which the same is connected, the lever 239 is raised an amount sufficient to cause the complete closure of the gate. When the bell crank 98 is released, the link 241 is lowered and the length of the slot therein is sufficient to permit the lever 239 to function in its ordinary intended manner without interference. For swinging the bell crank 98, a solenoid 10 is employed whose plunger is pivotally connected to said bell crank. The bell crank 98 is normally held in the position shown in Fig. 1 through a suitable spring and may be moved into its freeing position through the action of the solenoid 10.

The exciter used with this form of the invention is indicated at 48 and comprises an armature 49, a series field coil 50 and a shunt field coil 51 of usual construction. One side of the armature 49 of the exciter 48 is connected to the conductor 348 while the other side of said armature is connected to the series field coil 50 through a conductor 116. The other side of the exciter series coil is connected directly to the shunt field coil 51 and also to a conductor 349. Conductor 349 leads up to a variable resistance 350 which is connected to the other conductor 347 leading from the field coil on the rotor 345 of the generator 343.

The variable resistance 350 is used for varying the exciter current and may be cut in in four steps which is accomplished through a number of relays PA, PB, PC, and PD which are provided with their respective coils PA1, PB1, PC1, and PD1. These relays are further provided with switches PA2, PB2. PC2, and PD2. Operating in conjunction with these relays a solenoid 351 is utilized which comprises a coil 352 and a plunger 353. The coil 352 of solenoid 351 is a potential coil and is tapped at the center and connected through a conductor 354 with phase 2 of generator line GL. The ends of this coil are connected through conductors 355 and 356 with the other two phases of the generator line. The plunger 353 is operatively connected to a swinging arm 357 which has attached to it a roller 358. This roller may engage any of four contacts 359, 360, 361 and 362. The arm 357 is connected through a conductor 373 with a switch GS4 of a relay GS which in turn is connected through a conductor 1373 with switch GZ of a relay G to be presently more fully described which switch is connected through a conductor 374 with phase 3 of the generator line GL. The various contacts 359, 360, 361 and 362 are connected respectively to the coils PA1, PB1, PC1 and PD1 through conductors 363, 364, 365 and 366. The other sides of these coils are all connected together and to a common conductor 367 which is directly connected to phase 2 of the generator line. The various switches PA2, PB2, PC2, and PD2 are respectively connected through conductors 368, 369, 370 and 371 with various taps on the resistance 350. The other sides of these switches are all connected together to the conductor 347 leading from the generator field coil. The end of the resistance 350 is connected through a conductor 372 with the conductor 347.

When switch G2 is closed, as will be presently explained, current flows through conductors 374 and 373 and through the particular circuit closed by the arm 357 energizing the particular relay PA, PB, PC, or PD connected in said circuit and operating the switch controlled by said relay to short out a section of the resistance 350. The shorting out of sections of the resistance 350 changes the field excitation for the generator and the consequential voltage at the generator line. Inasmuch as the solenoid 351 is operated by the potential of the generator line the same operates to control the generator potential by varying the field excitation so as to maintain any desired voltage at the generator. Although the resistance 350 has been shown as divided into four sections, it will readily be comprehended that any number of sections may be employed and a corresponding number of relays used to cut the same in or out.

For regulating the shunt field current of the exciter 48, a rheostat 375 is employed which is provided with a resistance 376 and an arm 377 mounted on a shaft 378, which arm is adapted to contact with various taps formed on the resistance 376 to short out or cut in sections thereof. The shaft 378 is connected to a worm gear 379. This worm meshes with a worm 380 mounted on a shaft 381. The shaft 381 is driven by a motor 382. The motor 382 is a reversible motor and is provided with two windings for rotating the same in opposite directions. These windings are connected together and through a conductor 385 with phase 2 of the generator line GL. Mounted upon the rheostat 375 and near the ends of the path of movement of the arm 377 are two limit switches 386 and 387. These limit switches are adapted to be engaged by the arm 377 and opened when the said arm reaches its two extreme positions. The two windings of motor 382 are connected through conductors 388 and 389 to these two switches.

For controlling the operation of the motor 382, a potentially operated reversing switch 391 is employed. This switch comprises a coil 392 and a plunger 393. The plunger 393 is operatively connected to a swinging arm 394 which is adapted to make contact with either of two fixed contacts 395 and 396. The contact 395 is connected through conductor 397 with switch 386 while the contact 396 is connected through a conductor 398 with switch 387. Coil 392 is tapped at the center and is connected through a conductor 399 with phase 2 of generator line GL. The ends of this coil are connected through conductors 400 and 401 with phases 3 and 1 respectively of the generator line.

The resistance 376 is connected in series with the shunt field coil 51 of exciter 48. This resistance is connected through a conductor 1376 with conductor 531 which in turn is connected with the field coil 51. The other side of the resistance 376 is connected through a conductor 1377 with conductor 486, which in turn is connected through conductor 348 with the armature 49 of exciter 48. When the resistance 376 is fully included in series in the shunt coil circuit of the exciter, a normal no-load exciting voltage is produced which is desirable in starting the generator. When, however, the circuit breaker has been closed, it becomes necessary to increase the exciter voltage. This is accomplished by shunting out a portion of the resistance 376. For this purpose, a relay GS is employed which includes a coil GS1, a normally closed switch GS3 and two normally open switches GS2 and GS4. The coil GS1 of this relay is connected through a conductor 570 with another conductor 567 which is connected to the switch C7 of the circuit breaker C. The switch C7 is connected through a conductor 568 with conductor 583 leading from phase 3 of the generator line GL. The other side of the coil GS1 of relay GS is directly connected to conductor 385 which in turn is connected to phase 2 of generator line GL. As soon as the circuit breaker C is closed, relay GS is operated which closes the switch GS4 and opens the switch GS3. At the same time another circuit is closed through the switch GS2 which is connected as follows. A conductor 383 is connected to the arm 377 and to the switch GS2. This switch is further connected to the conductor 1376 leading from the resistance 376. When the switch GS2 is closed, a portion of the resistance 376 included between the arm 377 and the conductor 1376 is shunted out through the switch GS2 which increases the voltage of the exciter, causing the same to deliver the necessary voltage to take care of the load assumed by the generator when the circuit breaker is closed.

In the operation, the rheostat 375 is controlled through the reversing switch 391 which functions as a potential relay and which closes contact through either of the contacts 395 or 396, dependent upon the voltage in coil 392. Assume that arm 394 closes contact through contact 396 which is the case when the voltage has dropped. A circuit may then be traced from phase 3 of the generator line through conductor 374, switch G2, conductor 1373, switch GS4, conductor 373, switch arm 394, contact 396, conductor 398, switch 387, conductor 388 through motor 382 and through conductor 385 back to phase 2 of the generator line. This causes the motor to rotate worm 380 and turn the shaft 378 through the worm wheel 379 moving the arm 377 toward the right and cutting out a portion of the resistance 376. As soon as the arm 377 leaves switch 386, said switch is closed and the circuit may be established through either of the windings of motor 382 to cause the same to operate in either direction.

Assume that the switch arm 394 is in contact with the contact 395 which would be the case in the event the voltage was too great. A circuit would then be established from phase 3 of the generator line GL through conductor 374, through switch GS4 of relay GS, through conductor 373, switch arm 394, contact 395, conductor 397, switch 386, conductor 389, motor 382, and conductor 385 back to phase 2 of the generator line. This causes the motor to operate in the opposite direction, moving the arm 377 to the left. The voltage of the generator line impressed upon the coil 392 hence causes the arm 394 to swing one way or the other closing either contacts 395 or 396 and moving the arm 377 backward or forward in a manner to cut in or cut out the resistance 376 to regulate the excitation of the exciter 48 and the resulting voltage produced by said exciter. When the arm 377 reaches the other limit switch 387, said switch is opened and the motor 382 can only be rotated in the opposite direction to cause the resistance 376 to be cut in. After the said arm has left the switch 387 the device is again free to operate in either direction and regulation of the exciter current takes place as previously described.

In the event that the circuit breaker C should be opened while the switch arm 377 was shunting out a portion of the resistance 376 or in contact with the switch 387 opening the same, current for operating the motor 382 would not be available in the circuit previously mentioned, due to the opening of the switch GS4. To permit of returning the arm 377 to normal position, the normally closed switch GS3 of relay GS is employed. When the relay GS is deenergized the following circuit is established. Current may then flow from phase 3 of the generator line GL through conductor 374 through the normally closed switch GS3, through conductor 397, switch 386, conductor 389, motor 382, and conductor 385 back to phase 2 of the generator line GL. Motor 382 is now operated to move the arm 377 toward normal position and the circuit for so operating the motor continues until broken by said arm engaging the switch 386. When the relay GS is deenergized, switch GS2 is also opened, which cuts in the entire resistance 376, reducing the voltage of the exciter independently of the position of the arm 377. The arm 377 may then be brought back to normal position through the circuit established through switch GS3.

For providing power for operating the various devices and apparatus in the sub-station, current is taken both from the distribution line and the generator line through the common bus 390 and through other conductors which will be later specifically described. For controlling the operation of the sub-station from the control station, current is derived from a line 402, the two sides thereof being indicated at 403 and 404. At the control station, a reversing switch 405 is employed which has six contacts 406, 407, 408, 409, 410 and 411. The side 404 of line 402 is directly connected to contact 407, which in turn is connected through a conductor 412 with contact 410. In the control station, an ammeter 413 is employed which is used for indicating the various occurrences and operation of the apparatus in the sub-station. This ammeter is connected through a conductor 414 with contact 406. Another conductor 415 connects ammeter 413 with a switch 416 which serves to start the system. The switch 416 is connected through a conductor 417 with an adjustable rheostat 418 which in turn is directly connected to the side 403 of the line 402. The contact 406 of switch 405 is connected through a conductor 419 with contact 411. A volt meter 420 may be connected across the line 402 through two conductors 421 and 422 of which the conductor 421 is directly connected to the side 404 of the line and of which the conductor 422 is connected to conductor 417. The control line of the system is designated at 423—424 and runs between the two stations. The line 423 is connected within the station to a bus 425 to which various instruments in the sub-station are connected.

For controlling the operation of the various apparatus and devices of the sub-station, a master relay M is employed which includes a coil M1, and a number of switches M4, M5, M10, M11, M12, M13 and M14. This relay is operated through a protective circuit indicated in its entirety at 426 which when broken deenergizes this relay and disconnects and deenergizes the entire sub-station. A number of protective devices are connected in series in this circuit which operate to open said circuit when certain failures in the system occur, which will be later individually described.

For controlling the operation of the sub-station, a polarized relay E is employed which comprises a coil E1, a movable contact E2, and four fixed contacts E3, E4, E5 and E6. The coil E1 is connected to the side 423 of the control line through a conductor 428 and is connected to the side 424 of the control line through a conductor 429. The arm E2 is also connected to the side 424 of the control line through a conductor 430. When the reversing switch 405 is thrown in one direction, current is passed through the relay E swinging the arm E2 in one direction and closing contacts E3 and E4. When the reversing switch 405 is reversed, current flows through coil E1 of relay E so as to cause the switch E2 to swing in the other direction and to close contacts E5 and E6. The circuits through these contacts will be presently described in detail.

In the protective circuit are a number of protective devices for opening the master relay M which operate to disconnect the system in the event that the failure in the system occurs. One of these devices is actuated when the temperature of the generator shaft or bearing exceeds a certain degree. Another of these devices becomes operative in the event that the oil ceases to flow in the oiling system for the generator or turbine. Still another of these devices serves to open the protective circuit in the event that the generator shaft should drop out of proper position. Among these devices is also a device which becomes operative in the event that the exciter of the generator should fail to function. Still another of these devices includes an anti-start device, which prevents the system from being automatically started after the protective circuit has once been opened and until the operator has had an opportunity to investigate the cause of the failure.

The anti-start device comprises a relay A which includes a coil A1 and two switches A2 and A3, switch A3 being normally open and switch A2 normally closed. The coil A1 of this relay is connected through conductors 465 and 427 with the bus 425. This coil is further connected through a conductor 466 with switch A3 of said relay which in turn is connected through a conductor 467 with switch M5 of the main relay M. A conductor 468 connects switch M5 with bus 449 connected to the other side of the control line as will be presently described. Both switches A2 and A3 are connected to the bus 449. The switch A2 is connected to the switch M4 through a conductor 1468 while said switch M4 is connected through a conductor 448 with bus 449.

The switch A2 is in the protective circuit and is normally closed and when the other conditions requisite to the energization of the main relay coil M1 occur, so as to close the other switches in the protective circuit, the main relay is operated and the various normally open switches thereof closed. When switch M5 of main relay M is closed, a circuit is established through coil A1 which closes the relay A. Upon closure of this relay the current is established and the relay maintained energized through the switch A3, which shunts the switch M5. The protective circuit is maintained closed through the switch M4 which serves as a maintaining switch and which shunts the switch A2. As soon as the master relay is closed, the circuit so procured is maintained through this switch and the switch A2 opened. Switches M5 and M4 are so set that M4 closes before M5. When the protective circuit is opened through any of the protective devices, the coil M1 becomes deenergized and the main relay opens. At the same time the maintaining switch M4 is opened and the circuit shunting switch A2 opened. If the cause of the shut down was only momentary as for example an overload or surge on the line, the system would immediately tend to become automatically reinstated. However, relay A prevents this since the switch A2 is now open, due to the maintaining of the relay A energized through its own maintaining switch A3. Only by opening the starting switch 416 and depriving the bus 425 of potential will the relay A1 become deenergized and the system placed in condition to be again started.

The protective devices for opening the circuit upon undue rise of the temperature of the generator shaft or bearings includes a potential relay 431 in the nature of a volt meter which is provided with a coil 432 and a switch 433. The device protecting against dropping of the generator shaft includes a normally closed switch 441 which is adapted to be engaged by a collar 442 on the generator shaft 346 which in the event that the generator shaft should drop would move said switch 441 and open the same. The device for protecting against oil failure includes a switch 443 adapted to become open in the event that the flow of oil through the oiling system of the generator ceases. These various switches are connected in the control circuit 426 as follows.

The conductor 427 connects coil M1 with the bus 425. The other side of this coil is connected through a conductor 444 with one side of switch 433. The other side of this switch is connected through conductor 445 with switch 443. Switch 443 is connected through a conductor 446 with switch 441 which in turn is connected through a conductor 447 with switch A2. Switch A2 in turn is connected through a conductor 464 with the bus 449 connected to contact E4 of the polarized relay E. When the reversing switch 405 is thrown in the proper direction, arm E2 is moved to connect contact E4 with the control line 423—424. Current may then be traced from bus 425 of said control line through conductor 427, coil M1 of relay M, conductor 444, switch 433, conductor 445, switch 443, conductor 446, switch 441, conductor 447, switch M4, conductor 448, and bus 449 to contact E4. From this contact, current now flows through the arm E2 and then through conductor 430 back to the other side 424 of the control line. The master relay M is now operated closing all of the various normally open switches thereof and opening the one normally closed switch.

The relay 431 operates in conjunction with another similar relay 434 having a coil 435 and a switch 436 the function of which will be later described in detail. The two coils 432 and 435 of these relays are connected together and through a conductor 437 and conductor 563 with phase 3 of the generator line GL. The other two sides of these coils are also connected together and are connected through a conductor 438 to a rotary contact 439 mounted on the frame work 344 of generator 343 and leading the current to a bus 440 on the rotor 345 of the generator. The bus 440 is connected to two switches in parallel one of them being indicated at 450 and being a temperature controlled switch adapted to be closed upon the temperature of the bearing of the rotor 345 exceeding a predetermined degree. The other of the switches is a centrifugal switch indicated at 451 which is adapted to be closed upon the generator reaching a predetermined speed. This switch may be a mercury switch or any other similar switch may be utilized. A resistance 452 is connected in series with this switch. The switch 451 and the switch 450 are connected to a common conductor 453 which may be grounded to the frame of the generator or which may be led from the generator through another contact similar to the contact 439. In the event that this conductor is grounded, the phase 2 of the generator line GL would also be grounded as indicated at 454. The circuit through the two coils 432 and 435 may be traced as follows. Commencing with phase 3 of the generator line, current flows through conductor 563, through conductor 437, through both coils 432 and 435 in series, through conductor 438, through the rotary contact 439 and through two circuits in parallel one of them including the switch 450 and the other including the switch 451 and the resistance 452 in series. The current flows from these two parallel circuits through the common conductor 453 and through the frame work of the generator back to ground being thereby connected to phase 2 of the generator line. The two potential relays 431 and 434 are so adjusted that the same do not operate until the proper potential is placed across the potential coils 432 and 435 thereof. This is procured by closing either of the switches 450 or 451 which completes the circuit above mentioned either directly or through the resistance 452. Where the circuit is completed directly by the switch 450, the coil 432 of relay 431 functions, closing the switch 433. When, however, the circuit is completed through the resistance 452 the coil 435 of relay 434 operates which closes the switch 436 and performs other functions to be later more fully described. In the event that both switches 450 and 451 operate at the same time the switch 450 providing a short, shunting the resistance 452 causes the relay 431 to operate, which opens the protective circuit and deenergizes relay M which as in the other form of the invention disconnects the entire system.

The switch 443 operated through the circulation of oil functions as follows. In the oil circulating system is provided a case 455 formed with an upper compartment 458 and a lower compartment 457. Switch 443 is disposed in the lower compartment 457 and is provided with a blade 456 upon movement of which closure of the switch 443 is effected. The upper compartment 458 serves as an oil reservoir and flow of oil from this reservoir is controlled through a valve 459 operating in conjunction with an orifice 460 in the case 455 bringing the two compartments 458 and 457 into communication. The valve 459 is operated through a solenoid 461. Oil enters the case 455 through an inlet 462 and leaves the case through an outlet 463. When oil is flowing through the case 455 and the valve 459 is raised, the same passes through the orifice 460, a stream of oil from said orifice falls upon the blade 456 which moves the switch 443 into closing position. As soon as the stream of oil stops the switch 443 moves into open position. It will hence become readily apparent that the termination of circulation of oil through the device opens switch 443 and breaks the protective circuit, the outlet 463 communicates with the bearings of the generator and serves to lubricate the same. Similar devices may also be used for the other bearings of the sub-station machinery including the prime mover and exciter.

For operating the solenoid 461 controlling the flow of oil through the oil circulating protective device, a circuit is completed which is operated from the remote control line 423—424. A conductor 497 is connected to one end of this solenoid and runs to bus 425 leading from the side 423 of the control line. Solenoid 461 is further connected through a conductor 498 with bus 449 which is connected to side 424 of the control line when the switch 405 is swung in the proper direction. As soon as switch 405 is operated the electromagnet 461 is energized and the switch 443 actuated to close the same. This opens the valve 460 feeding oil to the system and operating the switch 443 as previously described to close the protective circuit and permit of starting the power plant.

The protective device which renders the system inoperable in the event of failure of potential from the exciter 48 will now be described. This device includes a relay GA having a coil GA1, a normally closed contact GA2, and two normally open contacts GA3 and GA4. The coil GA1 of this relay is connected through a conductor 483 with another conductor 484 which in turn is connected to the armature 49 of exciter 48 through conductor 349, the series field coil 50 and the conductor 116. The other side of this coil is connected to the other side of the armature 49 of the exciter through conductors 574, 486 and 348. As soon as the exciter 48 delivers sufficient voltage, coil GA1 is energized and the various switches thereof closed to control the operating circuits of the system as will presently be more fully described.

For the purpose of actuating the governor, solenoid 10 is used which serves to set the governor in operation through the movement of lever 98 and link 241. This solenoid is connected through a conductor 469 with common 390 and is further connected through a conductor 470 with the switch GA3 of relay GA. When potential is on the exciter, relay GA is energized and the switch GA3 closed. Current flows from switch GA3 through a conductor 471 to switch M11 of relay M which in turn is connected through a conductor 472 with a bus 473 connected to phase 3 of the distribution line DL. Upon closure of the main relay M a circuit is completed through switch M11 and solenoid 10 from phase 2 to phase 3 of the distribution line which energizes said solenoid and sets the governor into operation. The governor then functions as previously described bringing the generator 343 into operation.

For gradually starting and shutting down the generator, a slotted shaft 247 is employed which is slidably connected through a pin 252 to the lever 239. This shaft is threaded throughout the major portion of its length. A bevel gear 249 is screwed upon the shaft 247 and may be driven through a bevel gear 250. The bevel gear 250 is mounted upon a shaft 251 which is driven from a motor 73. The motor 73 is provided with two circuits so that the same may be rotated in either direction whereby the shaft 247 may be raised and lowered to provide the desired stop for limiting the movement of the limit lever 239. For terminating the operation of the motor 73, two limit switches 475 and 480 are provided which are connected in the respective circuits controlling this motor. These switches are disposed in the path of movement of an arm 253 secured to the shaft 247 which stops the motor when the limit lever 239 has arrived at the proper setting.

In order to bring the generator up to speed gradually motor 73 is utilized. This motor is formed with two windings connected together through a common conductor 168 with the common bus 390. One winding of the motor 73 is connected through a conductor 474 to the limit switch 475 which in turn is connected through a conductor 476 with switch GA4 of relay GA. This switch is connected through a conductor 477 with switch M10 of relay M which in turn is connected through conductor 478 with the bus 473. In the normal operation of the system, relay GA is energized, its coil being connected to the exciter and switch GA4 thereof closed. As soon as the master relay operates, a circuit is completed through the one winding of motor 73 which operating through the gears 250 and 249 rotates gear 249 in the particular direction which causes the same to move the shaft 247 downwardly and to gradually release the arm 239. Movement of the shaft 247 continues until limit switch 475 is opened through the engagement with arm 253, after which the circuit through the particular winding of motor 73 described is opened and the motor deprived of current. The limit lever 239 of the governor is then released, permitting the synchronizing of the generator and the subsequent assumption of load thereby.

The other winding of the motor 73 is connected through a conductor 479 with the limit switch 480. This limit switch is connected through a conductor 481 with switch M12 of main relay M which in turn is connected through a conductor 482 with the bus 473. Switch M12 is a normally closed switch and upon operation of the relay M becomes open, breaking the circuit through this particular winding of the motor. When the shaft 247 moves downwardly to free the limit lever 239 of the governor, switch 480 is released and closed. However, the circuit is broken through switch M12. When the plant is finally shut down and relay M brought into inoperative position, switch M12 closes and completes the circuit through the other winding of the motor 73 which moves shaft 247 back to normal position and raises lever 239 shutting off the governor and closing the gate to terminate the operation of the generator. It will be readily comprehended that the closing of the gate through the motor 73 is gradual when the shaft 247 reaches its uppermost position at which time the gate is completely closed. Switch 480 is then engaged by the arm 253 and opened, breaking the circuit through the winding of the motor. When the plant is shut down the exciter fails to produce potential and relay GA is opened which opens the circuit through the other winding of the motor 73 permitting the lever 239 to remain in closed position. Although I have employed a motor 73 for producing the timed opening of the gate through the action of the limit lever 239, yet it can readily be comprehended that any other suitable time controlled device may be employed for this purpose as for example a retarded solenoid or other similar device.

The exciter 48 for exciting the field of the generator 343 instead of being driven from the shaft of the generator or turbine is driven through a separate motor 487. This motor may be a three-phase, single phase, or other type of motor as desired. In the drawing a three-phase motor has been shown having a squirrel cage rotor 488 and three-phase windings 489. The windings 489 are connected through three conductors 490, 491 and 492 to three switches EA4, EA3, and EA2 of a relay EA. Switch EA2 is connected through a conductor 493 with the common 390. The switch EA3 is connected through a conductor 494 with the bus 473 from phase 3 of the distribution line while the switch EA4 is connected through a conductor 495 directly with phase 1 of the distribution line. It will readily be comprehended that three-phase power is drawn from the distribution line from the switches EA2, EA3 and EA4 for operating the motor 487 whereby the exciter 48 is operated. Relay EA is an auxiliary relay to relay M and serves to handle the entire current required for motor 487. This relay is operated by relay M. Coil EA1 of relay EA is connected through a conductor 496 with common bus 390, and is further connected through a conductor 497 with conductor 471 leading to switch M11 of relay M. When relay M is operated, switch M11 is closed and current flows from phase 3 through conductor 473 through conductor 472, switch M11, conductor 471, conductor 497, coil EA1, conductor 496, and back to phase 2 through the common bus 390. This operates relay EA closing switches EA2, EA3, and EA4 and throwing the exciter motor 487 on the line. Voltage of the exciter 48 as previously described is controlled through the resistance 350 and through the rheostat 375 and causes the generator to deliver voltage to the line GL. Relay EA is provided with a time delay opening device EA5 which serves to maintain the continued operation of exciter for a predetermined time after it has been deenergized. This causes the exciter to operate as a magnetic brake, causing the generating unit to come to rest.

After the generator 343 has been brought up to substantially synchronous speed and is delivering the proper voltage, the same is automatically synchronized with the distribution system and thereafter connected to the distribution line DL through the circuit breaker C. For the purpose of synchronizing, two motors 500 and 501 are employed each of which has attached to the armature shaft thereof two rotors 502 and 503. The rotor 503 is formed with a disc 504 which has issuing outwardly therefrom a flange 505. The disc 504 is provided with two contacts 506 and 507 (Fig. 4) fixed relative thereto and insulated therefrom. These contacts are electrically connected to two slip rings 508 and 509 on the rotor 503. The rotor 502 is provided with a flange 510 which has pivoted to it two radially swinging arms 511 and 512 (Fig. 3) which rotatably support two contact rollers 513 and 514. The arms 511 and 512 are drawn inwardly through tension coil springs 515 secured to said arms and to the disc 510. The two arms 511 and 512 are insulated from one another and are electrically connected to two slip rings 516 and 517 on the rotor 502. Axially disposed with reference to the axis of the rotor 502 is a shaft 519. This shaft carries a flanged sleeve 520 which is provided with a finger 521 serving as a contact member and adapted to make contact with either of the contacts 506 or 507. The shaft 519 is rigidly secured to the rotor 502 and driven thereby and is insulated from the motor and the contact rollers 513 and 514. The shaft 519 is electrically connected to a slip ring 541. Sleeve 520 is frictionally driven through the shaft 519 and is adapted to come to rest with the finger 521 in contact with either of the two contacts 506 or 507 depending upon the relative speed of the armature shafts of the two motors 500 and 501. The flange 505 of rotor 503 is provided with two segmental contacts 522 and 523 of which the contact 522 is a relatively short contact and is disposed in the path of movement of roller 514. The contact 523 is similarly disposed but inwardly from the edge of the flange 505 and is a relatively longer contact. The roller 513 is situated in a different plane from that of the roller 514 and is adapted to engage contact 523. Both of the contacts 522 and 523 are connected to a slip ring 524 on rotor 503, while the contacts 506 and 507 are connected to slip rings 508 and 509.

The motors 500 and 501 may be of the nature of synchronous motors or they may be motors such as are used in synchroscopes or for such purposes. These motors are adapted to operate at a speed proportional to the frequencies of the voltages impressed upon the same. For operating the motors 500 and 501 a relay S is employed. This relay is provided with a coil S1 and with two normally open switches S2 and S3. The coil S1 of this relay is connected through a conductor 525 with the common 390 of the system. This coil is further connected through a conductor 526 with the switch L2 of a latch relay L. Said switch is in turn connected through a conductor 527 with switch M13 of relay M. This switch is connected through a conductor 528 with conductor 583 which in turn is connected to phase 3 of the generator line GL. As soon as main relay M goes on, current for operating relay S is provided since L2 is normally closed which operates relay S and closes the two switches S2 and S3 thereof. The two motors 500 and 501 are connected to the common 390 of the system through conductors 529 and 530. These motors are further connected through conductors 531 and 532 with the switches S3 and S2 respectively. Switch S3 is connected to the bus 473 through a conductor 533 while the switch S2 is connected through a conductor 534 with the conductor 527 which is indirectly connected to phase 3 of the generator line GL through the main relay switch M13 and conductors 528 and 437. It will thus be seen that potential for operating motor 500 is taken from the distribution line and that for operating motor 501 is taken from the generator line and when the relay S is closed through the operation of the main relay M both switches S2 and S3 are closed which provide potential for both motors and set the motors into operation.

The two motors 500 and 501 are designed to travel in the same direction and when the generator potential is in synchronism with the distribution line potential both these motors rotate at the same rate of speed and in the same direction. Under such circumstances there is no relative movement of the two rotors 502 and 503 but the said rotors travel in unison, which causes the rollers 513 and 514 to make contact with their respective contacts 522 and 523 closing various circuits and effecting the connection of the generator to the distribution system when the generator is in synchronism therewith. These circuits will now be described in detail.

In the synchronizing circuits, two relays SC and SD are employed. The relay SC is an auxiliary relay which operates the circuit breaker C and eventually cuts in the generator. This relay is an ordinary relay having a coil SC1 and two normally open switches SC2 and SC3. The relay SD is a time controlled relay and is adapted to operate slowly and to return to normal rapidly. The relay SD is provided with a coil SD1 and with a normally open switch SD2 and with a dash pot SD3, for timing the same. The coil SD1 of relay SD is connected through a conductor 535 with slip ring 517 and is further connected through a conductor 536 with the common bus 390. The switch SD2 of relay SD is connected through a conductor 537 with slip ring 516 and is further connected through a conductor 538 with the coil SC1 of relay SC. This coil is connected through a conductor 539 with the common 390. A conductor 540 connects the coil SC1 to switch SC2. The slip ring 541 which is connected to finger 521 and the slip ring 524 which is connected to contact 523 are connected together through conductors 542 and 543 and are further connected through a conductor 544 with the conductor 532 leading up to switch S2. The two slip rings 508 and 509 which are connected to contacts 506 and 507 are connected through conductors 545 and 546 with the two windings of motor 25. These windings are both connected together and connected through a conductor 547 with the common bus 390. Switch SC2 is connected to coil SC1 through conductor 540 as previously described and is further connected through a conductor 548 to the conductor 544 leading from switch S2.

The operation of the synchronizing apparatus is as follows. Upon closure of relay S, motors 500 and 501 are operated which causes the rotors 502 and 503 to have a relative movement, the speed of which is dependent upon the differences in frequencies of the generator and distribution system and in having a relative direction of rotation depending upon which of the two frequencies is the greater. If the relative rotation of the two rotors 502 and 503 is in one direction, sleeve 520 which is carried by the rotor 502 is moved until the finger 521 thereof contacts with the contact 507. When the relative movement of these rotors is in the opposite direction, sleeve 520 is also moved in the opposite direction until the finger 521 thereof contacts with contact 506. In this manner the two circuits through the windings of the motor 25 are energized, the said windings being so connected as to cause the adjustment on the spring of the governor to cause the generator to pick up speed when its frequency is below that of the distribution system and to lower its speed when the frequency of the generator is above that of the distribution system.

When the rotors 502 and 503 travel at the same rate of speed, the frequencies of the generator and distribution system are equal. The synchronizing apparatus is so designed that when the roller 514 is in contact with contact 522, the generator potential is also in phase with the distribution system potential. When the roller 513 contacts with contact 523, the following circuit is established. Starting with phase 3 of the generator line GL current flows through bus 583, conductor 528, switch M13, of relay M, conductor 527, to switch S2 through conductor 544, conductor 543, slip ring 524, contact 523 and roller 513, through slip ring 517, conductor 535, coil SD1 and through conductor 536 back to the common bus 390. This energizes coil SD1 of relay SD which tends to move the plunger thereof into switch closing position. If the length of time of contact of the roller 513 with contact 523 is sufficient to close the switch SD2, another circuit is established. The relay SD is so timed that said circuit is established only when the generator frequency is sufficiently close to the distribution system frequency to permit of closing the circuit breaker. When the switch SD2 is finally closed, the circuit referred to may be completed providing roller 514 is in contact with contact 522. This circuit may be traced as follows. Commencing with conductor 544 current flows from phase 3 of the generator line as previously described through conductor 543, slip ring 524, contact 522, roller 514, slip ring 516, conductor 537, switch SD2, conductor 538, coil SC1 of relay SC and conductor 539 back to the common 390. When these conditions simultaneously occur the relay SC is energized which closes switches SC3 and SC2. Switch SC2 is a maintaining switch shunting the switch produced by the contact 522 and roller 514 and maintains relay SC1 closed once said relay has been set in operation by the closing of the circuit just mentioned. The closing of the relay SC1 completes another circuit which operates the circuit breaker C. This circuit includes a conductor 549 which is connected to the common 390 and to coil C1 of circuit breaker C, a conductor 550 which connects coil C1 with switch SC3, and another conductor 551 which connects switch SC3 with conductor 527 which derives energy through the main relay switch M13 from phase 3 of the generator line. This operates circuit breaker C closing switches C2, C3 and C4 and cutting the generator line into the distribution line.

Circuit breaker C, is normally held in open position through a spring (not shown) or otherwise. The circuit breaker is latched in closing position through a latch relay L having a coil L1, a normally closed switch L2 and having a plunger L3 adapted to engage a suitable lug C8 on the circuit breaker C. The coil L1 of latch relay L which holds the circuit breaker C closed is energized from the exciter 48. The circuit for operating the coil L1 of this relay will now be described. In this circuit is employed an overload relay O which has two coils O1 and O2 connected to the two current transformers 190 and 191 through conductors 553, 554 and 555. This relay is provided with two switches O3 and O4. The coil L1 of relay L is connected through a conductor 552 with switch O3 which is connected through a conductor 557 with switch O4. Switch O4 is connected to a conductor 558 which in turn is connected to conductor 348 through an intermediate conductor 486. The other side of coil L1 is connected through a conductor 559 with switch C5 of circuit breaker C. This switch is in turn connected through a conductor 560 with a conductor 561 leading to switch M14 of main relay M. This switch is connected through a conductor 562 with another conductor 563 which in turn is connected to conductor 349 through an intermediate conductor 484. As soon as the switch C5 of circuit breaker C is closed which occurs after synchronism has occurred and and the coil C1 of circuit breaker C energized, a circuit is completed which may be traced as follows. Commencing with armature 49 of exciter 48, current flows through conductor 348, conductor 486, conductor 558, switch O4, conductor 557, switch O3, conductor 552, coil L1, conductor 559, switch C5, conductor 560, conductor 561, switch M14, conductor 562, conductor 563, conductor 483, conductor 349, through the series coil 50 of the exciter, conductor 116 and back to the armature 49 thereof. This energizes the latch relay L operating the latch plunger to hold the circuit breaker C closed. At the same time, switch L2 of latch relay L is open. This switch controls the entire synchronizing mechanism which is completely disconnected upon the opening of said switch.

In the operation of the latch relay L in releasing the circuit breaker and with the circuit as described, as soon as switch M14 opens the latch coil L1 would be de-energized and the circuit breaker opened. This would occur when the circuit breaker was under load, resulting in considerable arcing at the switches C2, C3 and C4. To overcome this, a switch 556 is employed which is adapted to be engaged by the shaft 247 operated through motor 73. This switch is positioned so that the same becomes opened at no-load position of the governor control mechanism. This switch is connected through two conductors 564 and 565 with conductors 561 and 562 respectively. It will be noted that this switch shunts the switch M14 of main relay M maintaining the latch coil L1 energized and holding the circuit breaker closed until the load is taken off the generator. When such condition occurs, the switch 556 is automatically opened and the latch deenergized and the circuit breaker opened to cut out the generator.

To cause the generator to take on load, a solenoid 11 is used with this device which operates to change the tension on the spring opposing the movement of the fly balls of the governor. This solenoid is connected to the common 390 through a conductor 566 and is connected through another conductor 567 with switch C7. Switch C7 in turn is connected through a conductor 568 to conductor 583 which in turn is connected to phase 3 of the generator line GL. Immediately upon closing the circuit breaker C, switch C7 is closed and the solenoid 11 energized which increases the pressure on the spring of the fly balls of the governor causing the gate to open and the generator to take on load.

The overspeed switch 451 previously referred to which is centrifugally operated and driven by the rotor 345 of the generator 343 operates in conjunction with a solenoid 74. The plunger of this solenoid has connected to it an arm 254 which is adapted to engage a nut 256 screwed upon the end of a bar 255. This bar is pivoted to the governor control lever 239 and when the solenoid 74 is energized, is raised to reduce the gate opening to no-load position. As previously brought out, the circuit from the switch 451 is connected in parallel with the circuit from the temperature controlled switch 450 both of which circuits are connected to the two coils 432 and 435 of the potential relays 431 and 434. Due to the resistance 452 the relay 434 can be made to operate when the switch 451 is closed. This relay is connected as follows. A conductor 571 connects switch 436 directly to the conductor 583 leading from phase 3 of the generator line. Switch 436 is further connected through a conductor 572 with solenoid 74 which as stated operates in conjunction with the lever 254, the screw 255 and nut 256 to control the amount of load taken by the generator. This solenoid is further connected through a conductor 573 with the common bus 390. Closure of switch 451 hence operates relay 434 which closes switch 436 and energizes coil 74. This lifts the limit lever 239 of the governor closing the gate and reducing the speed of the generator. If desired, the nut 256 may be so adjusted as to bring the generator back to no-load speed or any other adjustment might be had.

For controlling the operation of the exciter, a relay G and the relay GA previously referred to are employed. The relay G comprises a coil G1, a normally closed switch G3 and a normally open switch G2. The coil G1 of relay G is controlled through a centrifugally operated switch 43 on the governor 100, which is adapted to close when the fly balls of the governor reach a predetermined speed. A conductor 575 connects this switch with conductor 583 leading from phase 3 of the generator line GL. Switch 43 is further connected through a conductor 576 with coil G1. The other side of coil G1 is connected through a conductor 577 with the common bus 390. As soon as the governor is brought up to speed, switch 43 is closed and relay G is energized. The circuit for controlling the voltage regulating rheostat 375 and the resistance 350 includes the switch G2 as previously brought out. As soon as the governor is brought into operation, switch G2 is closed which energizes these circuits and permits the voltage regulating apparatus to function as explained. The coil GA1 of relay GA is connected through conductors 483 and 484 with conductor 349 which in turn is connected to the series coil 50 of the exciter. The other side of coil GA1 is connected through a conductor 574 with a conductor 486 which in turn is connected through conductor 348 with the armature 49 of the exciter. As soon as the voltage of the exciter rises sufficiently, relay GA is operated which closes switches GA4 and GA3 and opens switch GA2. The switch GA4 of relay GA as previously described controls the circuit for operating motor 73. It will hence be readily comprehended that the generator is not started unless the exciter is functioning properly so as to cause the generator to deliver voltage. Switch GA3 controls the starting solenoid 10 as previously explained. Likewise the governor is not set into operation until after the exciter is producing sufficient potential.

In order that the current of the exciter be at a maximum while starting, to assist in helping the exciter to build up, a circuit is used which employs the two switches G3 of relay G and switch GA2 of relay GA. The switch GA3 is connected through a conductor 578 to the conductor 486 leading from the armature 49 of the exciter. This switch is further connected through a conductor 579 to switch G3. Switch G3 in turn is connected through a conductor 580 with another conductor 581 which in turn is connected to the shunt coil 51 of the exciter. Before the two relays G and GA become energized, switches G3 and GA2 are closed and the circuit just mentioned completed. This circuit serves to short the rheostat 375 giving the exciter full potential across the same to cause it to positively build up. As soon as the exciter voltage comes up, relay coil GA1 is energized operating relay GA and opening switch GA2. This cuts in the rheostat 375 and the system functions as previously described. As soon as generator voltage comes up and the centrifugal switch 43 on the governor is closed, coil G1 also is energized and said circuit further broken through switch G3. The reason for the two switches G3 and GA2 in this circuit is that in the event one of these switches should accidentally drop and close the circuit, the other one would still hold it open thereby preventing excess excitation on the generator during the operation thereof.

Attached to the cross head 99 of governor 100 is a cam 159 which is adapted to engage to rollers 161 and 256 operating two switches 41 and 42. The switch 41 is normally closed and the switch 42 is normally open. The functions of these switches will be presently explained.

In the operation of a power plant, it becomes desirable to limit the load taken by the generator in accordance with the amount of water available for the driving of the turbine. Toward this end, I employ a float 586 which is disposed in a separate chamber, not shown, in close proximity to the generator and which is in communication with the water fed to the generator. The float 586 is movable within this chamber and is adapted to correspond in elevation with the water elevation of the water in the mill pond. This float is connected to a rod 587 extending upwardly therefrom which is pivotally connected to a lever 588 disposed within the power plant and in proximity to the governor. The lever 588 is pivoted intermediate its ends and has attached to it an arm 589. Arm 589 is pivoted to a floating lever 560 intermediate the ends thereof which lever is provided at one end with an adjusting screw 590 adapted to engage the limit lever 239 of the governor proper and to determine the setting thereof. The other end of the lever 560 is pivoted to the plunger of a solenoid 591 which in turn is mounted upon and carried by the lever 588. A spring 592 holds the plunger of solenoid 591 within the same and also moves the lever 560 into engaging position with the limit lever 239. It can readily be comprehended that as the float 586 is raised and lowered that the adjusting screw 590 is brought into engagement with lever 239 serving as a stop for terminating the movement of said lever and the consequential opening of the gate. The solenoid 591 operates to swing the lever 560 in such a manner that the adjusting screw 590 is completely disengaged from the lever 239 permitting said lever to function independently of the same. In conjunction with the circuit for operating solenoid 591, a potential relay 593 is employed which is provided with a coil 594 of a movable pointer or contact 596 and two fixed contacts 597 and 598. The coil 594 of this relay is connected through a conductor 599 with the bus 425 from the side 423 of the control line. This relay is further connected through a conductor 600 with conductor 449 which when the switch 405 is closed in one direction is connected to the side 424 of the control line. The pointer 596 of this relay is connected through a conductor 601 with switch C6 of the circuit breaker C which in turn is connected through a conductor 602 with another conductor 603 which in turn is connected to contact E3 of polarized relay E. This pointer is further connected through a conductor 604 with switch 41 which is operated through its roller 161 by the cam 159 on the cross head 99 of the governor. A conductor 606 connects the switch 41 to the conductor 603 which as previously stated was connected to contact E3 of the relay E. Contact 598 of relay 593 is connected through a conductor 615 with solenoid 591 which in turn is connected through a conductor 616 with the bus 425. When the switch 405 is thrown in the proper direction and the proper potential applied to the control line 423—424 through rheostat 418, the coil 594 of potential relay 593 is operated and pointer 596 brought in contact with contact 598. This completes the following circuit. Starting with bus 425 which is connected to the side 423 of the control line, current flows through this bus through conductor 616, solenoid 591, conductor 615, contact 598, pointer 596, conductor 601, switch C6 of circuit breaker C which was closed upon closing of the circuit breaker, conductor 602, conductor 603 to contact E3 of polarized relay E to the arm E2 thereof and through conductor 430 back to the side 424 of the control line. This energizes solenoid 591 which moves the arm 560 in such a manner as to withdraw the adjusting screw 590 from engagement with the governor arm 239. The governor may now function freely and independently of the height of the water in the mill pond. If the pointer 596 is disconnected from contact 598 by varying the potential on the control line 423—424 relay 591 is de-energized and the operation of the generator regulated in accordance with the headwater in the mill pond.

In the remote manual control of the sub-station through the control line 423—424 switch 405 is thrown in the direction specified which operates polarized relay E in the manner described. If desired, the sub-station may be placed under automatic control rather than by manual control in which case the operation of the sub-station would be controlled through a clock such as designated at CL or through a float control device governed by the headwater in the mill pond and indicated at FL. This is accomplished by throwing the switch 405 in reverse which changes the polarity on the control line 423—424 and which operates the polarized relay E in a reverse manner causing the arm E2 to make contact with contacts E5 and E6. The circuits controlled thereby will now be described in detail.

The clock CL includes two normally open switches CL1 and CL2 and a suitable mechanism for closing these switches at any predetermined time. The float mechanism FL includes a float FL1 which is disposed in the mill pond and which carries a float rod FL2. This rod is provided with stops FL3 and FL4 which are arranged to swing a lever FL5 when the same engages said stops. The lever FL5 serves to open and close two switches FL6 and FL7. The switch CL1 of clock CL is connected through a conductor 617 with another conductor 618, which in turn is connected to switch FL7. Switch FL7 is connected through a conductor 619 with the bus 449, and with the clock switch CL1, through a conductor 620. When the water in the mill pond reaches a certain elevation, switch FL7 is closed. When this occurs the following circuit is completed. Starting with side 424 of the control line, current flows through conductor 430, switch arm E2, contact E6, conductor 618, switch FL7, through conductor 619, conductor 449, conductor 464, switch A2 of the relay A, conductor 447, switch 441, conductor 446, switch 443, conductor 445, switch 433, conductor 444, coil M1 of relay M and bus 425 back to the side 423 of the control line. This actuates main relay M starting the system in operation as previously described. If desired, the clock CL may be placed in operation and caused to start the system in exactly the same manner. From an inspection of the drawing, it will be noted that switch CL1 is in parallel with switch FL7 which would complete the same circuit and also start the main relay and bring the system into operation.

In the operation of the sub-station where economy is desired in the consumption of the available water in the mill pond, the device operated by the float 586 is utilized. The adjusting screw 590 of this float is so regulated as to cause the generator to take a certain load dependent upon various conditions of operation. At certain times particularly during a peak load, it becomes sometimes desirable to cause the generator to carry all the load it possibly can providing there is enough water in the mill pond to handle it. In order to accomplish this result automatically the switch FL6 of the float FL and the switch CL2 of the clock CL are employed. These switches are connected as follows. Switch CL2 is connected through a conductor 621 with contact E5 of polarized relay E. This switch is further connected through a conductor 622 with switch FL6. Switch FL6 is in turn connected through a conductor 623 with conductor 611 which in turn is connected to conductor 615. It will be noted that both switches CL2 and FL6 are in series. When both of these switches are simultaneously closed, which occurs when there is sufficient water in the mill pond and at the time clock CL is set to close switches CL1 and CL2 the following circuit is completed. Commencing with side 424 of the control line, current flows through conductor 430, switch arm E2, contact E5, conductor 621, switch CL2, conductor 622, switch FL6, conductor 623, conductor 611, conductor 615, solenoid 591, conductor 616, and bus 425 back to the side 423 of the line. This operates relay 591 releasing the float control and permitting the governor to function without hindrance. The generator will then take the predetermined maximum load.

When the master relay M is opened, in the normal shut down of the plant, switch M11, which controls relay EA is opened. Relay EA controls the exciter motor 417 and if no other mechanism were employed, relay EA would be deprived of energy immediately upon the opening of switch M11. This however is not desired as it is preferred that the gate be brought to substantially no load position of the generator before the generator is cut out. To hold the exciter 487 in, until the proper time, a switch 800 is employed which is adapted to be opened and closed by the arm 253 on the threaded shaft or rod 247. The switch 800 is connected through a conductor 801 with conductor 471 previously referred to and is further connected through a conductor 802 with the bus 473. The switch 800 shunts the switch M11 so that the circuit, controlling relay EA and the operation of the exciter 487, is not opened until the arm 253 engages said switch and raises the same. This occurs when the limit lever 239 reaches approximately no load position.

Inasmuch as the solenoid 10 is connected in parallel with the coil EA1 of relay EA, switch 800 also controls the energization of this coil and the normal shut down of the governor proper. The governor proper is hence not shut down until the limit lever 239 reaches substantially no load position and at the same time that the relay EA is deenergized.

Although I have shown the switches 800 and 556 operating simultaneously, it can be readily comprehended that individual arms may be used for independently operating these switches and the switch 430 so as to cause these switches to all operate at predetermined positions of the limit lever 239. It can further be comprehended that two switches may be used for independently operating solenoid 10 and relay EA instead of the one switch 800 which is illustrated in the drawings, so as to cause said devices to become operated at independent predetermined positions of the limit lever.

For indicating the occurrence of the various steps in the connection of the sub-station to the distribution line, the ammeter 413 previously referred to is employed. This ammeter functions to indicate the current consumed by the various apparatus connected thereto and is provided with a pointer 626 and scale for indicating the exact state or condition of the apparatus connected to the control line as brought out in my co-pending application for patent, Serial No. 517,675. This ammeter, however, has one additional feature which provides an automatic signal when the generator is being shut down. For this purpose a gong or bell 624 is employed and the ammeter 413 is provided with a contact 625 disposed in the path of movement of the pointer 626 thereof. The pointer 626 is connected through a conductor 627 with conductor 415 referred to while the contact 625 is connected through a conductor 628 with the bell 624. The bell 624 in turn is connected through a conductor 629 with the side 404 of the line 402. When the ammeter approaches zero position, the pointer 626 contacts with the contact 625 connecting the bell 624 to the line 402 and producing the desired alarm.

For the purpose of indicating the elevation of the water in the mill pond or in the power plant a resistance 614 is employed. This resistance consists of an open wound coil of resistance wire which is immersed in the water and which extends from a position corresponding to high water level to a position corresponding to low water level. Disposed in close proximity to this resistance is a bar 632 which is of substantially the same length as the resistance 614 and which serves as an element for completing a circuit in the water in the mill pond through resistance 614. Resistance 614 is connected through a conductor 613 with switch 42 which switch is connected through a conductor 633 with conductor 611, said conductor in turn being connected to conductor 615 and to the contact 598 of potential relay 593. The bar 632 is connected to a conductor 634 which in turn is connected to bus 425. The resistance 614 is connected in the control circuit thereby affecting the reading on the ammeter 413 and indicating the height of the water in the mill pond, the scale of ammeter 413 being calibrated to read directly in linear measurement. This resistance is controlled by the contact 598 of potential relay 593 and when the proper voltage has been impressed upon the control line the relay 593 is operated to close switch 596—598 giving the desired indication. Operating in conjunction with the resistance 614 is another resistance 609 which indicates the opening of the gate controlling the flow of water to the turbine. This resistance is adapted to be engaged by a contactor 608 movable with the crosshead 99 or at a speed proportional to the speed thereof, said contactor shorting out a portion thereof. Resistance 609 is connected through a conductor 610 with bus 425 while contactor 608 is connected through a conductor 607 with contact 597 of relay 593. When the proper voltage is impressed upon the control circuit, relay 593 is operated to close switch 597—596 which throws resistance 609 on the control circuit and disconnects resistance 614. This gives a reading on the ammeter 413 corresponding to the position of the cross head 99 and the gate proper. The attendant at the control station may hence ascertain the elevation of the water in the mill pond or the position of the governor at will and through the single control circuit.

It might be here stated that switches 41 and C6 previously referred to are in parallel controlled by the pointer 596 of the relay 593. The switch 41 is positioned so that the same becomes opened when the governor cross head 99 is at no-load synchronous speed position. As soon as this occurs the circuit is broken and the ammeter drops indicating that the generator is now up to synchronous speed. As soon as the circuit breaker closes and the generator is connected, the circuit is completed through the switch C6 instead of through switch 41 which indicates that the generator is connected to the line.

For the purpose of providing communication between the sub-station and the control station, a telephone line 630—631 is employed. This telephone line is connected to a telephone 635 in the control station and to a telephone 636 in the sub-station. These telephones are constructed in the ordinary manner and are provided with speaking and ringer circuits adapted to be brought into operation upon the lifting of the receiver from the hook in the customary manner.

In order to ascertain what is going on at the sub-station without the use of the control line, certain equipment is employed which is adapted to render signals capable of being transmitted through the telephone and received in the control station. In the operation of the sub-station, it is desirable to determine the position of the gate and also the elevation of the water in the mill pond. In addition it is desirable to determine the voltage of the distribution line at the sub-station and also the current or load on the line at such locality and other information. This is accomplished as follows.

For indicating the voltage and current of the distribution line, a revoluble member 637 which is driven through a transmission gearing 638 from an electric motor 639 is employed. The revoluble member 637 includes two slip rings 641 and 642 electrically connected together of which the ring 641 is provided with a short insulated section 640. A brush 644 makes contact with the ring 642 while two brushes diametrically opposed indicated at 645 and 646 make contact with the ring 641. The revoluble member 637 carries a rotating brush 648 which is adapted to make contact with two groups of fixed contacts 650 and 651. These contacts are supported upon an insulated disc 649 and are disposed on opposite sides thereof and on opposite sides of the normal position of the brush 648. The operation of this device is controlled through three relays which are indicated at IA, IB and IC. The relay IA includes a coil IA1 and a normally open switch IA2. The relay IB includes a coil IB1 and two normally open switches IB2 and IB3. The relay IC includes a coil IC1, three normally open switches IC2, IC6 and IC5 and two normally closed switches IC3 and IC4.

In connecting the various equipment for the indication of current and voltage of the distribution line, the telephone circuit 630—631 is employed. The ringer circuit of the telephone is opened within the telephone 636 in the sub-station and two leads 652 and 653 connected thereto. In a similar manner two leads 654 and 655 are connected to the talking circuit of this telephone. The lead 652 goes to the coil IA1 of relay IA. A conductor 656 connects this coil to the switch IC4 of relay IC. The switch IC4 is connected through a conductor 657 with a normally closed switch IF2 of another relay IF to be later more fully described. This switch in turn is directly connected to the lead 653 in the ringer circuit of the telephone. When the hook on the telephone 635 is raised and the ringing apparatus actuated, which in the case of a rural telephone may be procured through an ordinary bell ringer and which in the case of telephone operating through an exchange is procured through the usual apparatus for such purpose in the exchange, the current flows through the ringer circuit of the telephone 636. A circuit is then established through coil IA1 of relay IA which energizes this relay and sets the indicating apparatus into operation. This is accomplished through switch IA2 of this relay which is closed upon operation of said relay. The switch IA2 is connected through conductors 659 and 668 with switch IB2 of relay IB and which is further connected through a conductor 660 with coil IB1 of said relay. Coil IB1 of relay IB is directly connected to the common bus 390 which as previously described is connected to phase 2 of the distribution line DL. Switch IA2 is further connected through conductor 661 with bus 473 which is connected to phase 3 of the distribution line DL. As soon as switch IA2 is closed, current flows through this circuit and energizes coil IB1. This completes two new circuits through switches IB2 and IB3. Switch IB3 is connected through a conductor 662 with another conductor 663 which in turn is connected to switch IC2 through another conductor 675. The other side of switch IB3 is connected through a conductor 664 with a conductor 665 which in turn is connected to conductor 661 leading from the bus 473. Conductor 662 is connected to still another conductor 666 which is connected to motor 639. The other side of motor 639 is connected through a conductor 667 with the common bus 390. When the switch IB3 is closed, current flows from bus 473, conductor 661, conductor 665, conductor 664, switch IB3, conductor 662, conductor 666, motor 639 and conductor 667 back to the bus 390. This sets the motor 639 in operation, causing the rotation of the revoluble member 637. The switch IB2 of relay IB is connected through the conductor 668 with conductor 659 previously referred to and is further connected through a conductor 669 with brush 645. The corresponding brush 646 is connected through conductor 670 with switch IC2 of relay IC. The brush 644 is connected through conductor 671 with conductor 665. Due to the fact that the ringing circuit is only momentarily closed, it becomes necessary to maintain the relay IB in operation during the rendition of the signals. This is accomplished through the brushes 645 and 644. The circuit is traced as follows. Commencing with conductor 661, a branch circuit shunting switch IA2 is provided which includes conductor 665, conductor 671, brush 644, ring 642, ring 641, brush 645, conductor 669, switch IB2, conductor 668 and conductor 659 back to the other side of the switch IA2. As long as the brush 645 remains in contact with ring 641, the circuit through coil IB1 is maintained regardless of the subsequent opening of the switch IA2 when the ringer circuit is disconnected.

As soon as relay IB is operated, a circuit is established through the coil IC1 of relay IC, which operates this relay. This circuit includes two conductors 672 and 673 which connect said coil with conductor 663. Another conductor 674 connects the coil IC1 with the common bus 390. Current flows from the conductor 665 which as previously described, is connected to bus 473, then through conductor 664, switch IB3, conductor 662, conductor 663, conductor 672, conductor 673, coil IC1 and conductor 674 back to the common bus 390. The relay IC is then energized. After the revoluble member 637 commences to rotate, brush 646 leaves the insulated section 640 of the ring 641 and comes in contact with said ring. When this occurs, the maintaining circuit is provided for maintaining relay IC closed. This circuit includes a conductor 675 which connects switch IC2 with conductors 663 and 672. It will be noted that the switch IC2 shunts switch IB3 which completes the circuit through coil IC1 of relay IC. Commencing with one side of switch IB3, this shunt circuit may be traced through conductor 662, conductor 663, conductor 675, switch IC2, conductor 670, brush 646, ring 641, ring 642, brush 644, conductor 671, conductor 664 and back to the other side of switch IB3. It will hence become evident that relay IC is maintained closed during the period over which brush 646 remains in contact with ring 641.

Closure of relay IC opens switch IC4 which disconnects the ringer circuit from the telephone and releases relay IA which assumes normal position. At the same time, switch IC5 closes the speaking circuit of the telephone which is connected through leads 654 and 655 with the switch IC5 directly. The telephone 636 may now be used for speaking in the customary manner, if desired, and may also function to receive and transmit certain signals to be heard through the indicating apparatus by the attendant at the control station.

For the purpose of indicating the amount of current flowing in the distribution line DL at the sub-station, a current transformer 677 is employed which is connected on phase 3 of the distribution line DL. This transformer is connected through two conductors 678 and 679 with coil 680 of an instrument indicated in its entirety at 681. This instrument is in the nature of an ammeter and is provided with a moving part 682 which is moved by the coil 680 and is adapted to assume various fixed positions with respect to said coil depending upon the amount of current passing therethrough. In the drawing, the instrument 681 has been shown merely in diagrammatic form and it can readily be comprehended that any suitable instrument having characteristics of an ammeter may be employed for this purpose. The movable part 682 of the instrument 681 is adapted to successively close any of a number of switches. For this purpose, a mercury switch 683 is employed having a number of contacts 684 therein adapted to be successively closed by the mercury therein when said switch is tilted. The part 682 is operatively connected to the switch 683 and serves to tilt the same in accordance with the amount of current flowing through the coil 680 which successively closes the contact 684. These contacts are connected through a number of conductors 685 with the various contacts 651 of the insulated disc 649. The mercury is connected to a conductor 690 which in turn is connected with another conductor 691 which is connected through conductors 672 and 675 with switch IC2. The rotating brush 648 on revoluble member 637 is connected through a conductor 686 with another conductor 687 which in turn is connected to a horn or siren 688. This device is placed near the mouthpiece of the telephone 636 and serves to transmit the sound produced thereby to the transmitter thereof so that the same may be heard by the attendant using the telephone 635 in the control station. The horn 688 is further connected through a conductor 689 with the common 390. By means of the circuit through the horn 688 it can readily be comprehended that when the rotating brush 648 contacts with any of the fixed contacts 651, a circuit is established through the horn 688 provided the switch 683 is at such an inclination as to make contact with the various contacts 684 associated therewith. Due to the fact that the brush 648 revolves at a uniform rate of speed procured through transmission 638 and motor 639 said brush successively contacts with contacts 651 at predetermined time intervals. This causes the intermittent operation of the horn 688, the said horn giving a sound for each of the contacts 684 closed by the mercury switch 683. Inasmuch as the number of these contacts closed depends upon the current in the coil 680 the number of sounds given by the horn is indicative of the amount of current flowing in the distribution line. The circuit through the horn may be traced as follows. Commencing with bus 473 current flows through conductor 661, conductor 665, conductor 671, brush 644, ring 642, ring 641, brush 646, conductor 670, switch IC2, conductors 675, 672, 691, and 690 through the mercury and the various parallel circuits produced by conductor 685 and closed through the mercury contacting with contacts 684. From these conductors the current flows successively through the various contacts 651 engaged by the rotating brush 648 and from there through conductor 686, conductor 687, through the horn 688, and conductor 689 back to the common 390.

For indicating the voltage of the system, an instrument 693 is employed which is similar to the instrument 681 except that the same operates as a voltmeter instead of as an ammeter. This instrument is connected through conductors 694 and 695 with the bus 473 and the common return 390 respectively. A mercury switch 696 similar to that used in conjunction with the instrument 681 is employed which is provided with a number of contacts 697 connected through conductors 698 with the contacts 650 on the insulated disc 649. The mercury in the switch 696 is connected through a conductor 699 with the conductor 691 and provides a circuit parallel to that controlled by instrument 681. In like manner when the brush 648 contacts with contacts 650 successive sounds are transmitted by the horn 688 which correspond in number to the number of contacts 679 in contact with the mercury in the switch 696. When the motor 639 is first operated, the circuit through horn 688 is first established through the contacts 650. A number of successive sounds is then sounded corresponding to the voltage of the distribution line. As soon as the brush 648 passes the last contact 650 corresponding to that of the contact 679 closed by the mercury switch 696, said brush continues to operate without affecting the horn and a short pause in the sounding of the sounds occurs. The contacts 650 and 651 are spaced from one another so as to leave a time interval between the actuation of the sounds from the voltmeter and ammeter so that the attendant may be advised of both the voltage and current of the system. As soon as the brush 648 contacts with contact 651 another series of sounds are sounded which indicates the current in the line. As soon as brush 645 strikes the insulated section 640 of ring 641 the maintaining circuit for relay IB is open which releases this relay. The circuit through motor 639 however is not broken upon opening switch IB3 but is maintained through switch IC2 of relay IC and through the brush 646 which when the brush 645 is in contact with section 640 must of necessity be in contact with ring 641. Only after brush 646 is again brought in contact with section 640 and the revoluble member 637 caused to make a complete revolution will the motor be disconnected. When this condition occurs switch IC2 is opened and the motor de-energized. At the same time the coil IC1 of relay IC is deprived of energy by the opening of the circuit through switch IC2 which serves as a maintaining circuit for energizing said coil. This releases relay IC and resets the same establishing the ringing circuit and breaking the talking circuit of the telephone.

The device for indicating the position of the gate and the elevation of the water in the mill pond operates through the telephone line 630—631. This device includes a revoluble member 700 similar to the member 637 which has mounted upon it two slip rings 702 and 703 electrically connected together of which the ring 702 is provided with an insulated section 704. Two brushes 705 and 706 make contact with the ring 702 while a brush 707 makes contact with the ring 703. The revoluble member 700 carries a rotating brush 708 which is adapted to make contact with two groups of contacts 709 and 710 on an insulated disc 711 the same as with the structure for indicating the voltage and current of the system. The revoluble member 700 is driven through a transmission device 723 from a motor 713. On the float rod FL2 of float FL is a contactor bar 714 which is adapted to make contact with a group of contacts 715 placed in the path of movement of said contactor bar. These contacts are connected through a number of conductors 716 with the various contacts 710. The cam member 159 attached to the cross head 99 of the governor 100 carries a similar contactor bar 717 which is adapted to make contact with a number of fixed contacts 718 disposed in the path of movement of said contactor bar. These contacts are connected through a number of conductors 719 with the contacts 709 on disc 711.

For operating the indicating device last named, three relays ID, IE and IF are employed. The relay ID comprises a coil ID1 and two normally open switches ID2 and ID3. The relay IE comprises a coil IE1 and two normally open switches IE2 and IE3. The relay IF comprises a coil IF1, the normally closed switch IF2 previously referred to, and two normally open switches IF3 and IF4.

The coil ID1 of relay ID is connected through a conductor 721 with switch IC6 which in turn is connected through a conductor 729 with conductor 665 previously referred to which in turn is connected to conductor 661 which leads from the bus 473. The other side of coil ID1 is connected through a conductor 720 with the common bus 390. When the motor 639 is started and relay IB closed, current is provided for this motor and for the coil IC1 of relay IC. This closes switch IC6. The coil ID1 is connected across busses 473 and 390 through switch IC6 so that as soon as switch IC6 is closed the coil ID1 is energized. This closes switches ID2 and ID3 of relay ID. The switch ID2 of relay ID is connected through a conductor 676 with conductor 721. This switch is further connected through a conductor 722 to another conductor 723 which in turn is connected to brush 705 contacting with ring 702. Another conductor 724 is connected with brush 707 and also with bus 473. The circuit through the coil ID1 of relay ID is maintained through the latter named circuit. This circuit may be traced as follows: Commencing with bus 473 current flows through conductor 724, brush 707, ring 703, ring 702, brush 705, conductor 723, conductor 722, switch ID2, conductor 676, conductor 721, coil ID1 and conductor 720 back to the common bus 390. In this manner, current is maintained through coil ID1 until the brush 705 reaches the insulated section 704 of the ring 702 after which the maintaining circuit is opened and the relay ID reset to normal.

Relays IE and IF have the same function as relays IB and IC in conjunction with the current and voltage indication of the system. The coil IE1 of relay IE is connected through a conductor 725 to a conductor 726 which in turn is connected to switch ID3. Switch ID3 is connected through a conductor 727 with switch IC3 which in turn is connected through a conductor 728 with conductor 665 previously referred to which, as stated, was connected to conductor 661 from bus 473. The coil IE1 is further connected through a conductor 730 with the common bus 390. During the operation of the motor 639 relay IC is actuated and switch IC3 opened. At the same time relay ID is also actuated and switch ID3 is closed. The coil IE1 is hence inactive as long as the motor 639 operates. When the motor 639 has turned the revoluble member 637 one complete revolution, brush 646 engages the insulated section 640 and breaks the maintaining circuit for the coil IC1. At the same time, the circuit for operating motor 639 is broken. The motor hence stops and relay IC is released. This closes the switch IC3. A circuit may now be traced from conductor 665 which is connected to the bus 473 through conductor 661, switch IC3, conductor 727, switch ID3, conductor 726, through conductor 725, coil IE1, and conductor 730 to the common bus 390. This energizes relay IE closing switches IE3 and IE2.

The circuit through the coil IE1 is maintained through switch IE2. This switch is connected on one side to conductor 726 and on the other side through a conductor 731 which in turn is connected to conductor 723 previously referred to. The circuit in which the switch IE2 and brush 705 are situated forms a separate circuit for energizing coil IE1 which circuit parallels in part the circuit previously referred to for originally closing relay IE. This circuit may be traced as follows: Commencing with bus 473, the circuit includes conductor 724, brush 707, ring 703, ring 702, brush 705, conductor 723, conductor 731, switch IE2, conductor 725, coil IE1 and conductor 730 back to the common bus 390.

Switch IE3 furnishes current for energizing relay IF, motor 713 and the multiple switch mechanism used in indicating the position of the gate and the multiple switch for indicating the head water in the mill pond. These various circuits will now be described in detail. A conductor 732 connects switch IE3 with the bus 473. Another conductor 733 leads from the switch IE3 and is connected to these various other devices as will be presently explained. Motor 713 is connected through a conductor 734 with the common 390 and through another conductor 735 with the conductor 733 just referred to. As soon as switch IE3 is closed, the motor 713 is energized and commences to operate. At the same time the relay IF is energized. Its coil IF1 is connected through a conductor 738 with conductor 733 and is directly connected to the common bus 390. The closure of switch IE3 hence simultaneously operates relay IF. Upon operation of this relay the two switches IF3 and IF4 are closed and the switch IF2 is opened. The relay is maintained through switch IF3. This switch is connected through a conductor 736 with conductor 733 and through another conductor 737 with brush 706. After the motor 713 has rotated a slight amount, brush 706 comes in contact with ring 702 and the circuit maintaining relay IF is established. This circuit may be traced as follows. Commencing with the common bus 390, current flows through coil IF1, conductor 738, conductor 733, conductor 736, switch IF3, conductor 737, brush 706, ring 702, ring 703, brush 707, conductor 724, back to the bus 473. The coil IF1 hence is maintained until the revoluble member 700 has made a complete revolution and the maintaining circuit again opened upon the brush 706 reaching the insulated section 704.

The switch IF3 and the brush 706 are also in a circuit which provides current for the motor 713 and the two systems of multiple contacts previously referred to. A circuit through this switch for controlling motor 713 may be traced as follows. Commencing with bus 473, the circuit may be traced through conductor 724, brush 707, ring 703, ring 702, brush 706, conductor 737, switch IF3, conductor 736, conductor 733, and conductor 735 to motor 713 and further through conductor 734 back to the common bus 390. It will readily be comprehended that when relay IF is opened the motor 713 is deprived of energy through the opening of the switch IF3.

The method of connecting up the multiple contact devices for the indication of the position of the gate and the head water will now be taken up. Contactor bar 717 operating in conjunction with the contacts 718 is connected through a conductor 739 with conductor 733. The contactor bar 714 which contacts with contacts 715 is also connected through a conductor 741 with conductor 733. The rotating brush 708 on disc 711 is connected through a conductor 740 with conductor 687 which leads from the horn 688. The operation of the devices for indicating the position of the gate and the head water is quite similar to that previously described for indicating the potential current of the system. After relay IF has been closed, motor 713, as explained, is set in operation and the revoluble member 700 is rotated. The contactor bars 717 and 714 occupy positions with respect to the contacts 718 and 715 respectively corresponding with the position of the gate and the head water in the mill pond. In these various positions the said contactor bars connect together a number of the contacts and complete circuits through conductors 719 and 716 depending upon the position of said contactor bars. As the revoluble member 700 rotates, brush 708 comes in contact first with the various contacts 709. Any of the contacts 718 closed through contactor bar 717 completes circuits through the conductors 719 as the brush 708 passes contact 709. Circuits are then established as follows. Commencing with bus 473, current flows through conductor 724, brush 707, ring 703, ring 702, brush 706, conductor 737, switch IF3, conductor 736, conductor 733, conductor 739, contactor bar 717 and successively through the contacts 718 in engagement with bar 717 through the respective conductors 719 and the contacts 709 as the same are successively engaged by brush 708 through brush 708 through conductor 740, through conductor 687, horn 688 and conductor 689 back to the common bus 390. This gives the horn a series of sounds which indicate through the number of sounds sounded, the position of the gate as controlled by the governor 100.

The time interval produced by the brush 708 passing over the blank space between the two sets of contacts 709 and 710 advises the attendant in the control station that the indication for the position of the gate has been completed. As the brush 708 passes over the second set of contacts 710 similar circuits are established which are in parallel with the circuits previously referred to. Starting with conductor 733, which is common to both of the circuits, current in the latter circuit flows through conductors 741, contactor bar 714, the various contacts 715, the corresponding conductors 716, contacts 710 and back to the brush 708 which is also common to both sets of circuits. A second series of sounds is then given the number of which corresponds to the position of float FL1 indicating the height of the water in the mill pond.

In the operation of the indicating system, it will be noted that as soon as the revoluble member 637 has made a half revolution, relay IB is cut out. As soon as this member has made a complete revolution, relay IC is cut out. When revoluble member 700 has made a half revolution, relays ID and IE are both cut out and after said member has made a complete revolution relay IF is also cut out. Due to the fact that relay IC is cut out before the completion of the signal, it becomes necessary to hold the circuit 654 and 655 closed which controls the speaking circuit of the telephone system and which subsequently opens the ringing circuit. For this purpose two conductors 742 and 743 are employed which are connected to the switch IF4. These conductors are in parallel with the conductors 654 and 655 and switch IF4 supplements the action of the switch IC5 to maintain the speaking circuit closed during the operation of the revoluble members 637 and 700. When relay IF drops out, the ringing circuit through conductors 652 and 653 is again established. This circuit may be traced as follows. Commencing with telephone 636 the circuit includes conductor 652, coil IA1, conductor 656, switch IC4, which is normally closed, conductor 657, switch IF2 and conductor 653 back to the telephone. Due to the fact that relay IC drops out before relay IF it becomes necessary to open the ringing circuit during the operation of the revoluble member 637 and 700 which is accomplished through both switches IC4 and the switch IF2 the latter of which supplements the switch IC4 maintaining the circuit open during the operation of the revoluble member 700.

My invention is highly advantageous in that the sub-station controlled thereby may be automatically operated from a remote point without the necessity of an attendant at the station. All of the various steps in the starting of the generator, in the synchronizing of the same, in the connection of the generator to the distribution line, in the subsequent control of the operation and in the regulation of the system are all automatically accomplished. Throughout the operation of the sub-station, the attendant at the remote point may accurately ascertain the exact condition of the apparatus and may be advised as to which apparatus is functioning and if the same is properly functioning. The signals or indications may be had over the ordinary telephone system so as not to require the use of additional lines between the sub-station and control station. The control system may be operated on direct current if desired. The signals rendered are such as may be easily interpreted to indicate the various positions or quantities intended to be disclosed to the attendant at the control station. A number of safety devices are provided so that the plant is automatically shut down and the fact brought to the attention of the attendant at the control station immediately after the occurrence of failures in the sub-station.

Changes in the specific form of my invention as herein disclosed may be made within the scope of what is claimed, without departing from the spirit of my invention.

Having described my invention, what I claim as new and desire to protect by Letters Patent is:

1. In an electrical system having a prime mover-generator unit, an alternating current power line supplied thereby, and switching means for connecting said generator to said line, means for actuating said switching means including a clock-controlled device, control circuit means including contacts in said clock device, means for causing a flow of current in a selected direction through one said control circuit means, and a device selectively operated according to the flow of current through said one circuit means for closing a starting circuit in cooperation with said clock device, in one position of said responsive means, and for establishing a circuit through said starting means independently of said clock device when in another position, said control circuit means also including devices whereby said clock may energize said starting means when said responsive means is in said other position.

2. In an electrical system, a generator, driving means for said generator, a source of energy for said driving means, operating means for controlling the power delivered by the generator, clock controlled means for rendering said operating means operative at a predetermined time of day and inoperative at another predetermined time of day, a second operating means for controlling the energy delivered by the generator, means for rendering said second control means operative when a predetermined amount of energy is available and inoperative when a different predetermined amount of energy is available, means for rendering said generator operative upon the actuation of either of said operating means, control means responsive to a change in the amount of energy available, said control means regulating the flow of energy to said driving means, and means for rendering said control means operative during the operation of either of said operating means.

3. In an electrical system, a generator, driving means for said generator, a source of energy for said driving means, two control means for controlling the energy delivered by the generator, separate means for independently rendering said control means operative, and means actuated by said control means for causing said operating means when simultaneously operating to procure a certain delivery of energy by the generator and when separately operating to procure a different delivery of energy by the generator.

4. In an electrical system, a generator, driving means for said generator, a source of energy for said driving means, a control circuit for controlling the amount of power delivered by said generator, a plurality of switches in said circuit, one of said switches being arranged to cause said generator to deliver power when a predetermined amount of energy is available, another of said switches being arranged to render said generator operative at a predetermined time of day, means included in said circuit for causing said generator to deliver a different amount of power upon simultaneous operation of said switches.

5. In an electrical system, a distribution line, a generator, driving means for said generator, a governor for said driving means, switching means for connecting said generator to said distribution line, time retarded apparatus for gradually adjusting said governor to reduce the power delivered by the generator and means responsive to the energy flowing for operating said switching means to disconnect the generator from the distribution line upon reduction of the power delivered by the generator.

6. A control system for a prime mover-generator unit and a source of operating fluid for said prime mover, including a gate for controlling the flow of said fluid to said prime mover, means for moving said gate, manually and automatically controlled operating means for controlling the actuation of said prime mover and said moving means, and a circuit including remote control means for selecting one of said operating means to control the actuation of said prime mover and moving means.

7. A control system for a prime mover-generator unit and a source of operating fluid for said prime mover, including a gate for controlling the flow of said fluid to said prime mover, means for moving said gate, manually and automatically controlled operating means for controlling the actuation of said prime mover and said moving means, and a circuit including means for producing a flow of current in a selected direction therein, and control means responsive selectively to said directional flow of electrical current for selecting one of said operating means to control the actuation of said prime mover and moving means.

8. A control system for a prime mover-generator unit and a source of operating fluid for said prime mover, including a gate for controlling the flow of said operating fluid to said prime mover, means for moving said gate, means for controlling the operation of said moving means, and a circuit including means for producing a flow of current in a selected direction therein and at a selected potential, and control means responsive selectively to the potential and direction of flow of current in said circuit for actuating said controlling means whereby said gate is caused to assume a selected position.

9. A control system for a prime mover-generator unit and a source of operating fluid for said prime mover, including a gate for controlling the flow of said fluid to said prime mover, means for moving said gate, means for controlling said moving means, a control circuit, means for passing a current at a selected voltage and in a selected direction through said control circuit, devices responsive to a predetermined voltage in said control circuit, other devices responsive to the direction of flow of current in said control circuit, and means connecting said devices and said controlling means so that said controlling means is selectively operated for producing a predetermined operation of said moving means according to said voltage and direction.

10. A control system for a prime mover-generator unit and a source of operating fluid for said prime mover, including a gate for controlling the flow of said operating fluid to said prime mover, means for moving said gate, two circuits selectively operable for causing said moving means to open or close said gate, a control circuit, means for producing a flow of current in a selected direction in said control circuit, and relay switch means in said control circuit selectively operated according to the direction of flow of current therein for selectively energizing one of said two circuits.

11. A control system as in claim 10 in which said relay switch means is a polarized relay.

12. A control system for a prime mover-generator unit connectible to a line, and a source of operating fluid for said prime mover, including clock-controlled first devices operative at a predetermined time of day, second devices operative when a predetermined amount of fluid is available at said source and inoperative when a different amount of fluid is available, means for controlling the flow of fluid to said prime mover and actuated by either said first or second devices to deliver electric power at a predetermined rate to said line, and means actuated by both said first and second devices cooperatively for causing said generator to deliver power at an increased rate to said line.

13. A control system as in claim 12, in which said last-named means operates to cause said generator to deliver power to said line at a rate proportioned to the amount of fluid available at said source.

14. A control system for a prime mover-generator unit connected to a line, and a source of operating fluid for said prime mover, including means for controlling the flow of fluid from said source to said prime mover, a first means for actuating said controlling means to cause said generator to deliver power to said line at a predetermined rate, a second means for actuating said controlling means to cause said generator to deliver power to said line at a predetermined rate, and a third means operating only when both said first and second means are in operative position for causing said generator to deliver power to said line at an increased rate.

15. A control system for a prime mover-generator unit and a source of operating fluid for said prime mover, including a clock-controlled means operative at a predetermined time of day and inoperative at another predetermined time of day for controlling the delivery of fluid from said source to said prime mover, other means responsive to the supply of fluid in said source and operative when a predetermined amount of fluid is available and inoperative when another predetermined amount of fluid is available for likewise controlling the delivery of fluid from said source to said prime mover, and further means operative only when said clock-controlled means and other means are simultaneously in operative position for controlling the delivery of fluid from said source to said prime mover for effecting a greater delivery of power from said prime mover.

16. A control system for a prime mover-generator unit connected to a line, and a source of operating fluid for said prime mover, including a gate for controlling the flow of said fluid to said prime mover, a speed governor driven with said prime mover, means controlled by said speed governor for moving said gate, and means responsive to the amount of fluid in said source for limiting the degree of opening of said gate proportionately to the amount of fluid available at said source.

17. A control system for a prime mover-generator unit connected to a line, and a source of operating fluid for said prime mover, including a gate for controlling the flow of said fluid to said prime mover, a speed governor driven with said prime mover, means for moving said gate and connected to said governor for control thereby, and means responsive to the amount of fluid in said source for limiting the degree of opening of said gate proportionately to the amount of fluid available at said source when less than a predetermined amount is present at said source.

18. A control system for a prime mover-generator unit connected to a line, and a source of operating fluid for said prime mover, including a gate for controlling the flow of fluid to said prime mover, means for moving said gate, means for controlling the degree of opening of said gate in proportion to the amount of fluid available at said source, and means responsive to the speed of the prime mover for closing said gate when said prime mover speed is above a predetermined rate.

19. A control system for a prime mover-generator unit and a source of driving fluid for said prime mover, including a gate for controlling the flow of fluid to said prime mover, means for moving said gate, a speed governor driven with said prime mover and connected for controlling the operation of said moving means, and a float responsive to the amount of fluid in said source and connected to limit the degree of opening of said gate in proportion to the amount of fluid available at said source.

20. A control system for a prime mover-generator unit and a source of operating fluid for said prime mover, including a gate for controlling the flow of fluid to said prime mover, means for moving said gate, a float responsive to the amount of fluid in said source, a mechanical connection to said float operated thereby to limit the maximum degree of opening of said gate in proportion to the amount of fluid available at said source, and means controlled by the prime mover speed for operating said gate when said prime mover speed is above a predetermined rate.

21. A control system for a prime mover-generator unit and a source of operating fluid for said prime mover, including a gate for controlling the flow of fluid to said prime mover, means for moving said gate, a float responsive to the amount of fluid available at said source, means operated by said float for limiting the maximum degree to which said gate may be opened, and means independent of said float for moving said limiting means to inoperative position.

22. A control system for a prime mover-generator unit with a source of operating fluid for said prime mover, including a gate for controlling the flow of said operating fluid, means for moving said gate, a motor-generator unit, an auxiliary source for supplying said motor, a control circuit including means for selectively energizing the same, and devices selectively operated according to the energization of said control circuit, circuit means connected to said motor-generator unit, said devices and said moving means for effecting a selected movement of said gate, and means responsive to the actuation of said prime mover and operated through one of said selective devices for controlling the energization of said motor-generator unit.

23. A control system for a prime mover-generator unit and a line connectible to said generator, including means for controlling the supply of energy to said prime mover, a circuit breaker for connecting said generator to said line, and means for effecting the opening of said circuit breaker and including means for operating said controlling means to slowly reduce the flow of energy to said prime mover to below a predetermined rate prior to opening said circuit breaker.

24. A control system for a prime mover-generator unit and a line connectible to said generator, including means for controlling the flow of energy to said prime mover, a circuit breaker for connecting said generator to said line, and means for opening said circuit breaker including operating means to slowly reduce the flow of energy to said prime mover to below a predetermined amount prior to the opening of said circuit breaker, and also including means for further decreasing the flow of energy to said prime mover after the opening of said circuit breaker.

25. A control system for a prime mover-generator unit and a line connectible to said generator, including means for controlling the flow of driving energy to said prime mover, a circuit breaker for connecting said generator to said line, disconnecting devices for opening said circuit breaker and including timed control means for slowly reducing the flow of energy to said prime mover, and devices for opening said circuit breaker when the flow of energy to said prime mover is below a predetermined rate.

ERICK PEARSON.